July 31, 1962  D. E. DEFORD ETAL  3,046,759
SHAFT COUPLING

Filed March 18, 1960  2 Sheets-Sheet 1

INVENTORS
Donald E. Deford
& Duane K. Dye
BY
Bryce Beecher
ATTORNEY

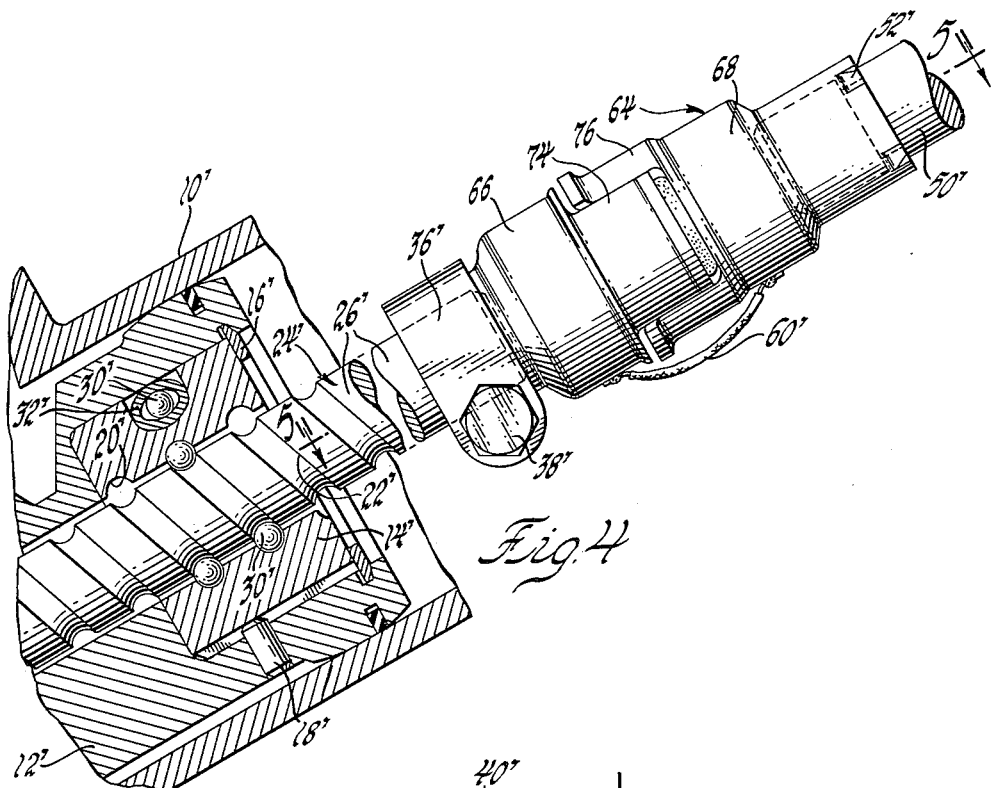
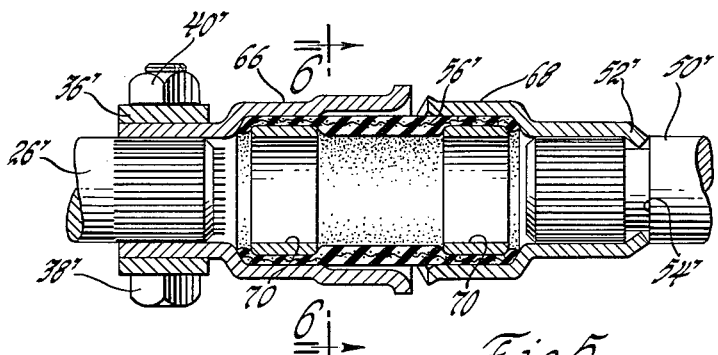
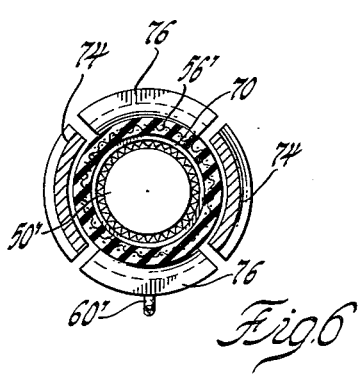
INVENTORS
Donald E. Deford
& Duane K. Dye
BY
Bryce Beecher
ATTORNEY

United States Patent Office 3,046,759
Patented July 31, 1962

3,046,759
SHAFT COUPLING
Donald E. Deford and Duane K. Dye, Saginaw, Mich., assignors to General Motors Corporation, Detroit, Mich., a corporation of Delaware
Filed Mar. 18, 1960, Ser. No. 16,022
4 Claims. (Cl. 64—11)

This invention relates to a flexible coupling of novel design and operation, particularly adapted for use in the joining of the sections of a bipartite steering shaft.

For the past several years it has been common in automotive practice to employ a two-piece steering shaft incorporating a flexible coupling capable of absorbing noise-producing vibrations and of permitting a degree of relative angular and axial displacement between the shaft sections. The latter feature is advantageous in that it facilitates installation of the steering gear and assembly of the vehicle.

The couplings conventionally used for the indicated purpose have been found unduly costly to manufacture and assemble and it is therefore an object of the present invention to provide a coupling of more simple design, yet one which is operationally equivalent to the conventional couplings. Other objects and features of the invention will be apparent from the following description of preferred embodiments thereof. The description will proceed with reference to the accompanying drawings wherein FIGURE 1 is a fragmentary longitudinal view of a power steering gear showing the coupling in side elevation, with certain other parts illustrated in section;

FIGURE 4 is a view similar to FIGURE 1 showing a modified form of the coupling;

FIGURE 5 is a section on the line 5—5 in FIGURE 4; and

FIGURE 6 is a section on the line 6—6 in FIGURE 5.

Figure 1:
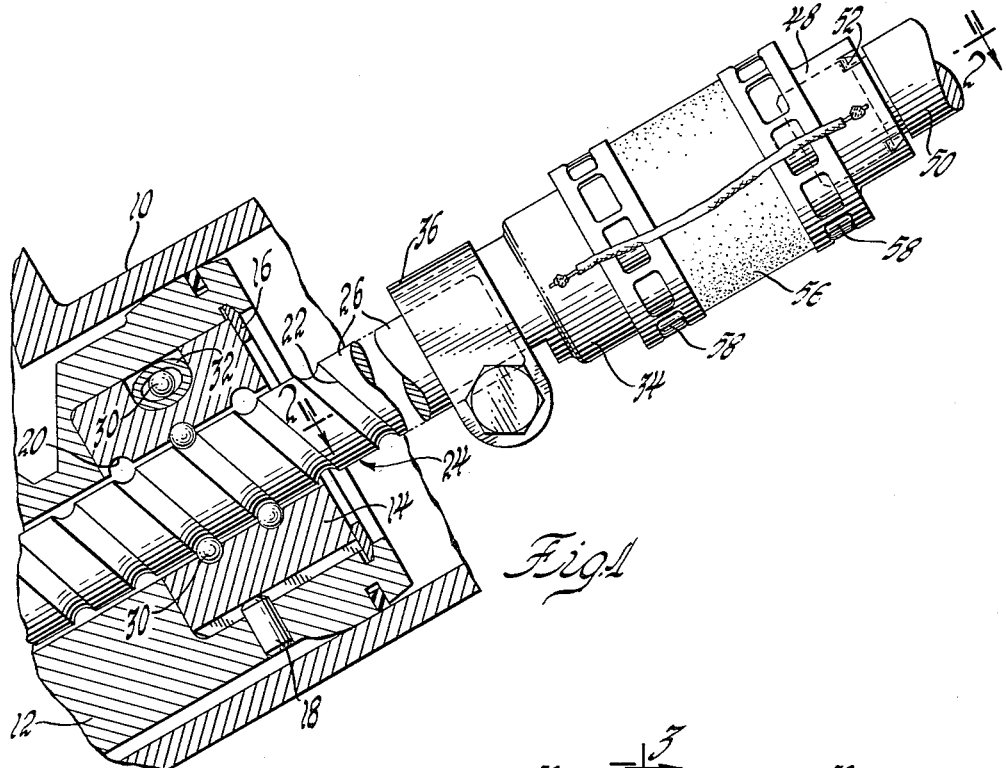

Referring first to FIGURE 1, the numeral 10 denotes the cylinder component of the power steering gear. Such gear is of the type disclosed, for example, in U.S. Patent 2,897,684, which issued August 4, 1959, to Clovis W. Lincoln et al.

Within the cylinder 10 is a piston 12 having a recess for the accommodation of a ball nut 14. The latter is prevented from axial movement in the direction outwardly of the piston by a snap ring 16 and has a pin connection 18 with the piston precluding angular movement thereof relative to the piston.

A helical groove 20 formed internally of the nut 14 is complementary to the helical groove 22 of a worm 24 located at the end of the steering shaft section 26. A train of balls 30 provides the operative connection between the worm 24 and the ball nut-piston. A return tube 32 allows for recirculation of the balls 30, as well understood in the art.

Figure 3:
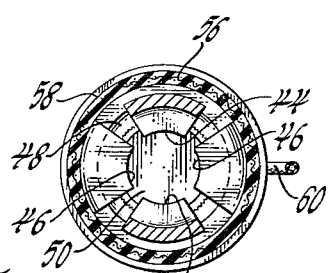
FIGURE 3 is a section on the line 3—3 in FIGURE 2.

The shaft section 26 at its upper end has a spline connection with a coupling element 34 and is surrounded by a clamp ring 36, made suitably tight by means of a bolt 38 and a nut 40. At its inner end, coupling element 34 terminates in what may be described as a yoke portion comprising fingers 44. These fingers operatively relate to the fingers 46 of a second coupling element 48, which has a spline connection with the upper steering shaft section 50. Coupling 48 will be noted as flanged at 52, the flange being accommodated in an annular groove 54 formed in the shaft section 50. As best shown in FIGURE 3, the fingers 44 are in spaced relation relative to the fingers 46.

Surrounding the coupling elements 34 and 48 is a reinforced hose section 56, secured to such elements by means of crimp rings 58. The material of this hose section may be neoprene, for example, strengthened with braided nylon cord.

A helical connector 60 forming part of the horn circuit of the vehicle, such circuit being not otherwise illustrated, serves to bridge the hose section 56, being required because of the previously described clearance between the fingers 44 and 46.

With the arrangement as described and illustrated, steering torque applied through the shaft section 50 is normally transmitted to the lower shaft section 26 via the hose section 56. Only in cases of extreme loads do the spaced fingers 44, 46, which in a sense constitute a "fail-safe" device, become engaged.

It should be obvious that at assembly of the vehicle, i.e., during mating of the chassis and body, great advantage attaches to the fact that by reason of the nature of the coupling the upper shaft section can be angularly displaced relative to the lower. Also it is advantageous that, as permitted by the lower spline connection, limited relative axial displacement of the shaft sections is possible. It will be understood that the last step at assembly, as to the coupling, is the affixation of the clamp device 36.

Figure 2:
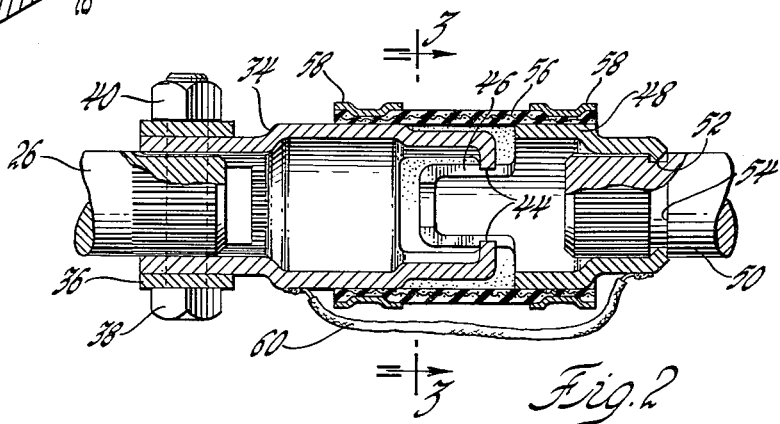
FIGURE 2 is a section on the line 2—2 in FIGURE 1.

In FIGURE 4, showing a modification, parts similar to parts shown in FIGURES 1–3 are denoted by the same numerals, these numerals, however, being primed. Here the coupling assembly 64 differs from the coupling first described particularly in that the reinforced hose section 56' is located inwardly of the coupling elements 66 and 68 and is secured thereto by means of expander rings 70. As in the case of the first described embodiment, the coupling elements 66, 68 are provided with spaced fingers 74 and 76 (FIG. 6) which inter-engage in the event the torque load exceeds the capacity of the hose section 56'.

We claim:

1. A coupling for transmitting torque between two shaft members or the like, said coupling permitting a degree of relative axial and angular displacement between said shaft members and comprising a yoke element at the coupled end of each said shaft member, each of said yoke elements carrying spaced fingers, at least one being connected to the corresponding shaft member through splining, the fingers of said yoke elements being interlocked with spaces between the interlocking fingers, and a reinforced hose section secured to said yoke elements inwardly of said fingers by means of expander rings located within said hose section.

2. A coupling for transmitting torque between two shaft members or the like, said coupling permitting a degree of relative axial and angular displacement between said shaft members and comprising a yoke element at the coupled end of each said shaft members, each of said yoke elements carrying spaced fingers, at least one being connected to the corresponding shaft member through splining, the fingers of said yoke elements being interlocked with spaces between the interlocking fingers, and a reinforced hose section secured to said yoke elements outwardly of said fingers by means of crimping rings encircling said hose section.

3. A coupling for transmitting torque between two shaft members or the like, said coupling comprising a yoke element at the coupled end of each of said shaft members, each of said yoke elements carrying spaced fingers and being connected to the corresponding shaft member through splining, at least one being secured against axial movement relative to the shaft member to which it is splined, the fingers of said yoke elements being interlocked with spaces between the interlocking fingers, and a reinforced hose section secured to said yoke elements inwardly of said fingers by means of expander rings located within said hose section.

4. A coupling for transmitting torque between two shaft members or the like, said coupling comprising a yoke element at the coupled end of each of said shaft members, each of said yoke elements carrying spaced fingers and being connected to the corresponding shaft member through splining, at least one being secured against axial movement relative to the shaft member to which it is splined, the fingers of said yoke elements being interlocked with spaces between the interlocking fingers, and a reinforced hose section secured to said yoke elements outwardly of said fingers by means of crimping rings encircling said hose section.

References Cited in the file of this patent

UNITED STATES PATENTS

| 1,656,715 | Weiland | Jan. 17, 1928 |
| 2,170,627 | Berryman | Aug. 22, 1939 |
| 2,867,102 | Williams | Jan. 6, 1959 |

FOREIGN PATENTS

| 660,305 | Germany | May 23, 1938 |